(No Model.)

A. G. RUSSELL & R. T. HAWKEY.
BRIDLE BIT.

No. 547,589. Patented Oct. 8, 1895.

Attest:
L. Lee.
Edw. P. Kinsey.

Inventors.
Richard T. Hawkey,
Arthur G. Russell, per
Thomas S. Crane, Atty.

UNITED STATES PATENT OFFICE.

ARTHUR G. RUSSELL, OF DENVER, AND RICHARD T. HAWKEY, OF MELVIN, COLORADO.

BRIDLE-BIT.

SPECIFICATION forming part of Letters Patent No. 547,589, dated October 8, 1895.

Application filed February 12, 1895. Serial No. 538,087. (No model.)

*To all whom it may concern:*

Be it known that we, ARTHUR G. RUSSELL, of Denver, and RICHARD T. HAWKEY, of Melvin, county of Arapahoe, State of Colorado, citizens of the United States, have invented certain new and useful Improvements in Bridle-Bits, fully described and represented in the following specification and the accompanying drawings, forming a part of the same.

The object of this improvement is to furnish a curb-bit with which the horse may be readily turned without cramping the curb strap or chain; and the invention consists of a bit-bar having ring-connections at the ends and curb-cheeks fitted to turn independently upon the bar near its ends. With such construction, the curb cheeks are provided, each above the bit-bar with an eye to which the ends of the curb chain or strap are attached, and into which the cheek-straps of the bridle are fitted.

The invention will be understood by reference to the annexed drawings, in which—

Figure 1:
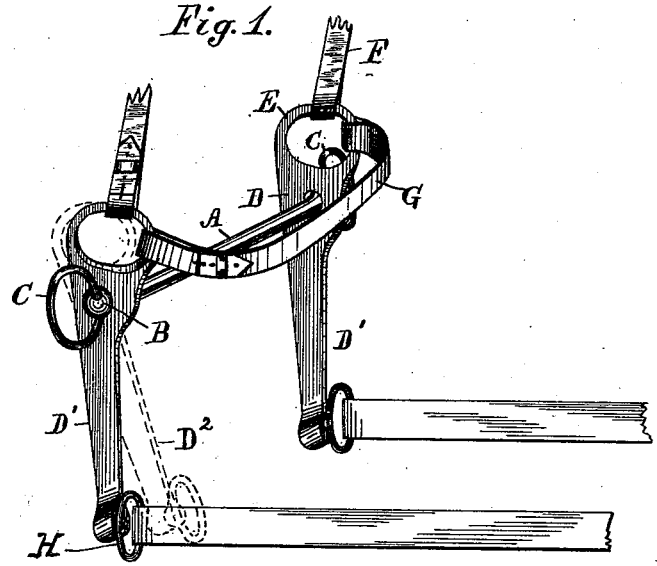
Figure 2:
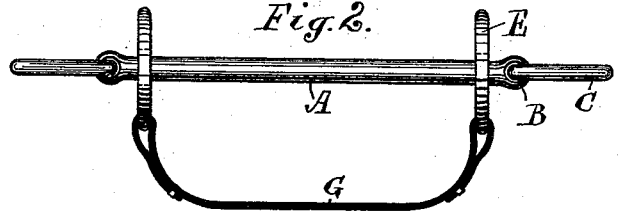
Figure 3:
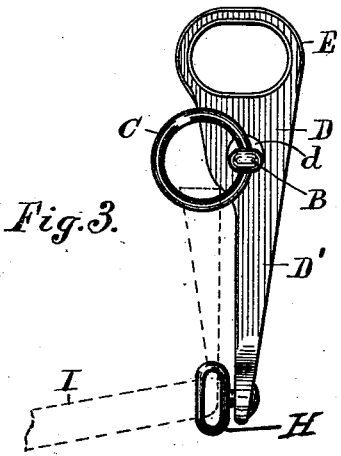

Figure 1 is a perspective view of the bit with the reins attached to the curb-levers. Fig. 2 is a plan, and Fig. 3 a side view, of the bit.

A designates the bit-bar, formed with eyes B at the ends to receive rings C to form connections for the reins when the bit is to be used without the curb.

D represents the curb-cheeks, which are formed with curb-levers D' and pivot-holes d, adapted to pass over the eyes B. The cheeks are furnished with large eyes E at the top, in which the cheek-straps F and the curb-band G may be secured. Such curb-band is shown formed of a leather strap in Fig. 1, but a chain may be used if preferred. The lower ends of the curb-levers are formed with eyes H, in which the reins I are secured, as shown in Fig. 1, when using the bit as a curb. The cheeks D turn freely upon the ends of the bit-bar adjacent to the rings C, and thus permit either of the cheeks to swivel upon the bit-bar, as indicated by the dotted lines D² in Fig. 1, when one of the reins is pulled to turn the horse. The opposite rein would at such time be entirely slack, and any tension upon the curb-strap G, caused by the turning of one of the cheeks, would obviously be relieved by the yielding of the opposite cheek and curb-lever D.

By combining the curb-lever with the cheek-piece, and forming the hole in the cheek of suitable size to slip over the eye B, we are enabled to make a very cheap and simple construction, and one with which the horse can be turned without cramping the curb-strap. The application of the rings C directly to the eyes upon the ends of the bit-bar admits the application of the reins to the ends of the bit-bar, so that it may be used as a plain bit whenever desired. The reins may, if desired, be extended through the rings H and buckled into the ring C when using the bit as a curb, and thus throwing part of the pulling strain upon the rings C.

Curb-bits have been made heretofore with cheeks to attach the bridle-straps and additional bent levers to actuate the curb; but the present invention differs from such construction in forming the cheeks and curb-levers in one single straight piece, which by means of the pivot-hole d, is adapted to fit loosely upon the ends of the bit-bar, where it is secured in the process of manufacture. The bit proper thus comprises only the bar or mouthpiece A and the cheeks D, having the curb-levers integral therewith. The eyes H are shown riveted to the lower ends of the curb-levers, but may be made integral therewith if desired.

We are aware that a spring nose-piece has been formed with cheeks to fit loosely upon the ends of a jointed bit; but in such construction the cheeks are formed of a single spring-band extended over the nose of the horse, and the halves of the mouthpiece are bent at an angle by pulling upon the reins, and the spring-cheeks are thus drawn inwardly. We are also aware that a mouthpiece has been combined with side levers having loose links pivoted thereto above the mouthpiece for connection with the cheek-straps. We do not claim any such construction; but What we do claim, and desire to secure by Letters Patent, is—

1. The bridle bit comprising the rigid bit bar A, having eyes B and rings C at the ends, the cheeks D fitted to turn freely upon the bit bar adjacent to the eyes B, and formed each above the bit bar with the eye E to receive the cheek strap F and curb band G, and below the bit bar with the curb lever D', the whole arranged and operated substantially as herein set forth.

2. The bridle bit comprising the rigid bit bar A, having the eyes B and rings C at the ends, and cheeks D fitted to turn freely upon the bit bar adjacent to the eyes B, and formed each with the pivot hole $d$ to pass over the eyes B, and provided above the bit bar with the eye E to receive the cheek strap F and curb band G, and below the bit bar with the curb lever D' having eye H to receive the rein, substantially as herein set forth.

In testimony whereof we have hereunto set our hands in the presence of two subscribing witnesses.

ARTHUR G. RUSSELL.
   RICHARD T. HAWKEY.

Witnesses:
 J. C. KNOWLES,
 H. R. MCCLELLAND.